Dec. 8, 1953     E. SOKOLIK     2,661,566
INSECT ELECTROCUTING APPLIANCE
Filed Dec. 16, 1950     4 Sheets-Sheet 1
FIG. 1
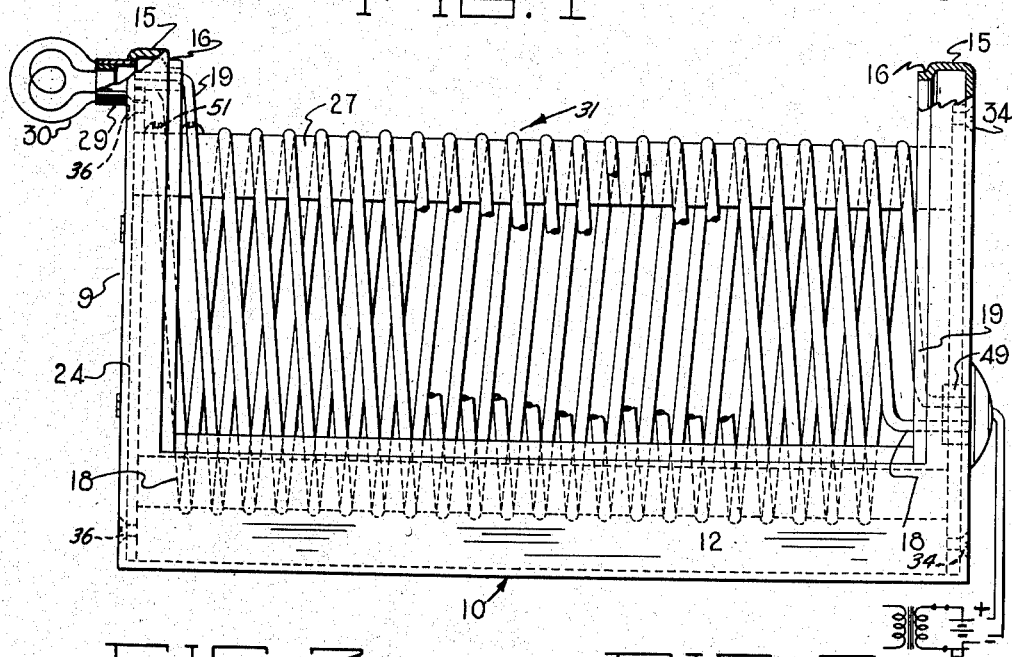
FIG. 2
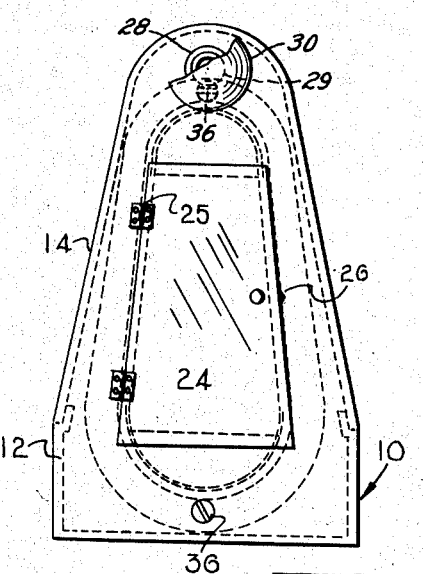
FIG. 3
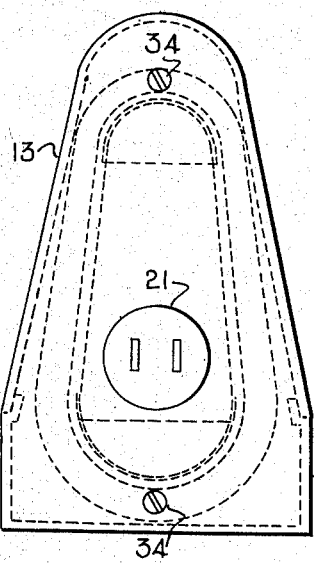
FIG. II
INVENTOR.
BY
Edward Sokolik Dec. 8, 1953   E. SOKOLIK   2,661,566
INSECT ELECTROCUTING APPLIANCE
Filed Dec. 16, 1950   4 Sheets-Sheet 2

INVENTOR.
BY Edward Sokolik

Dec. 8, 1953 E. SOKOLIK 2,661,566
INSECT ELECTROCUTING APPLIANCE
Filed Dec. 16, 1950 4 Sheets-Sheet 3
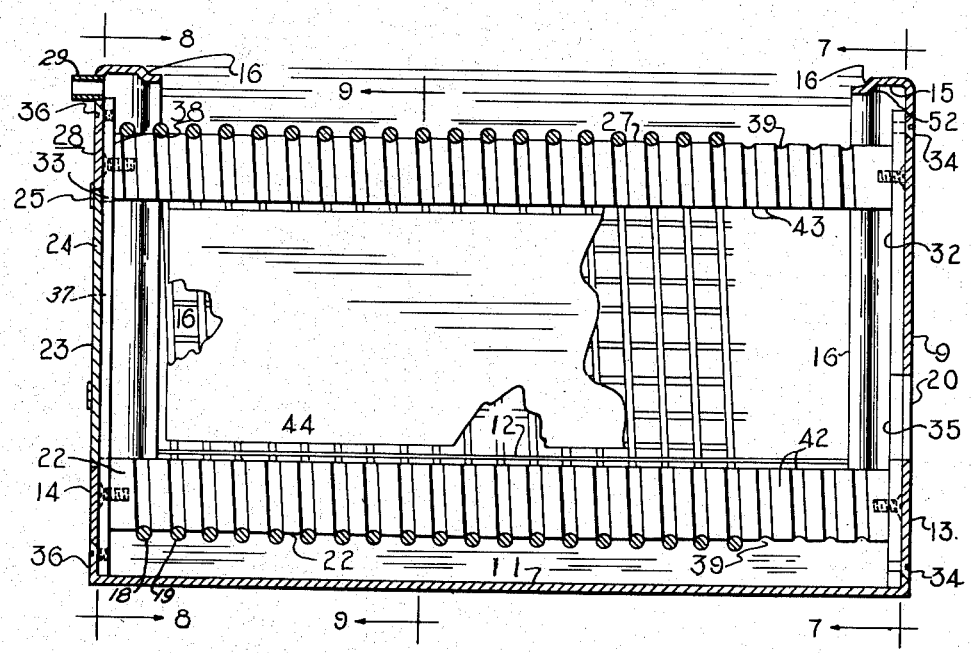
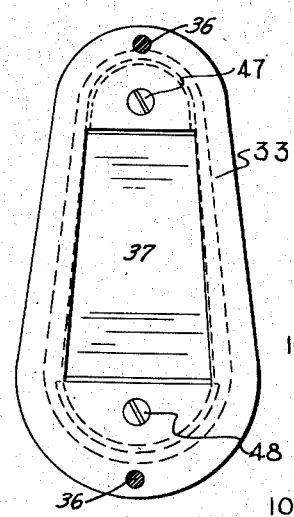
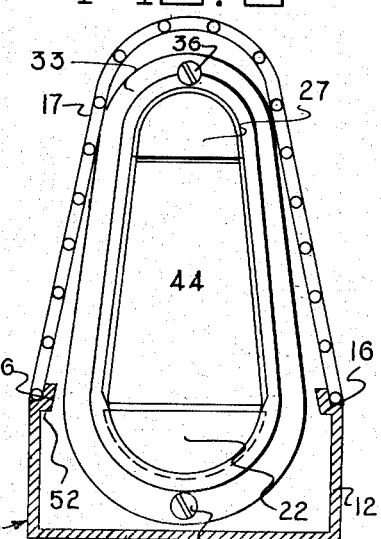
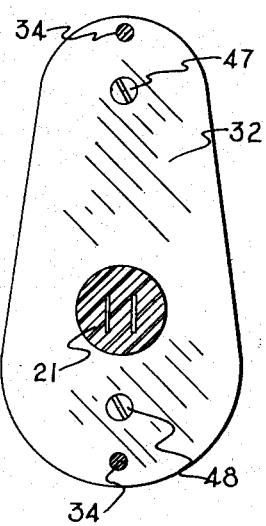
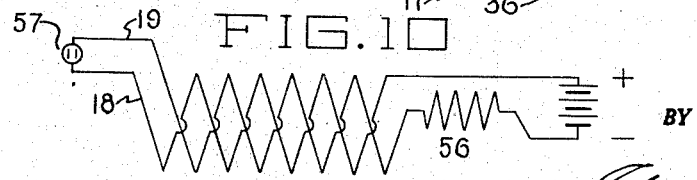
INVENTOR.

Patented Dec. 8, 1953

2,661,566

UNITED STATES PATENT OFFICE 2,661,566

INSECT ELECTROCUTING APPLIANCE

Edward Sokolik, New Brighton, Minn.

Application December 16, 1950, Serial No. 201,184

12 Claims. (Cl. 43—112)

My present application is a continuation-in-part of my application filed May 8, 1947, for a fly electrocuting appliance and relates to improvements in electrocuting appliances for general use, particularly for electrocuting flies and the objects are to provide an electrocuting appliance:

That will lure flies by scenting, electrocute, trap and conceal the electrocuted carcasses;

That serves as an ornate bric-a-brac as well as an article of utility; and

That is portable.

I attain the above objects and other advantages by the combination and arrangement in an electrocuting appliance of scenting fly luring features, electrocuting features, and features for trapping and concealing the electrocuted carcasses, as will be apparent from the proceeding specification.

In the drawings like characters designate like parts throughout the several views.

Fig. 1 is a side elevation of the appliance with a portion of the electrical conductors of one side of the grid broken off and minus the grille hood.

Fig. 2 is an elevation of the front end of the appliance.

Fig. 5 is a side elevation of the frame with portions broken off and a wire grille hood with vertical wire members, mounted thereupon.

Fig. 6 is a view of the appliance complete showing the frame and grille hood with horizontal wire members in longitudinally vertical section; the horizontal girders, end plates supporting the girders, and the greater portion of the fly luring element between the girders, in side elevation.

Fig. 7 is a view on line 7—7 of Figure 6, showing the rear end plate and screws securing same to the girders of the grid.

Fig. 8 is a view on line 8—8 of Figure 6, showing the front end plate and screws securing same to the girders of the grid.

Fig. 9 is a transverse vertical section on line 9—9 of Figure 6.

Fig. 10 illustrates one species of an electrical hook-up embodying a resistor and an indicating neon light.

Fig. 11 illustrates another species of a hook-up embodying a step-down transformer and an indicating incandescent light bulb.

Figure 3:
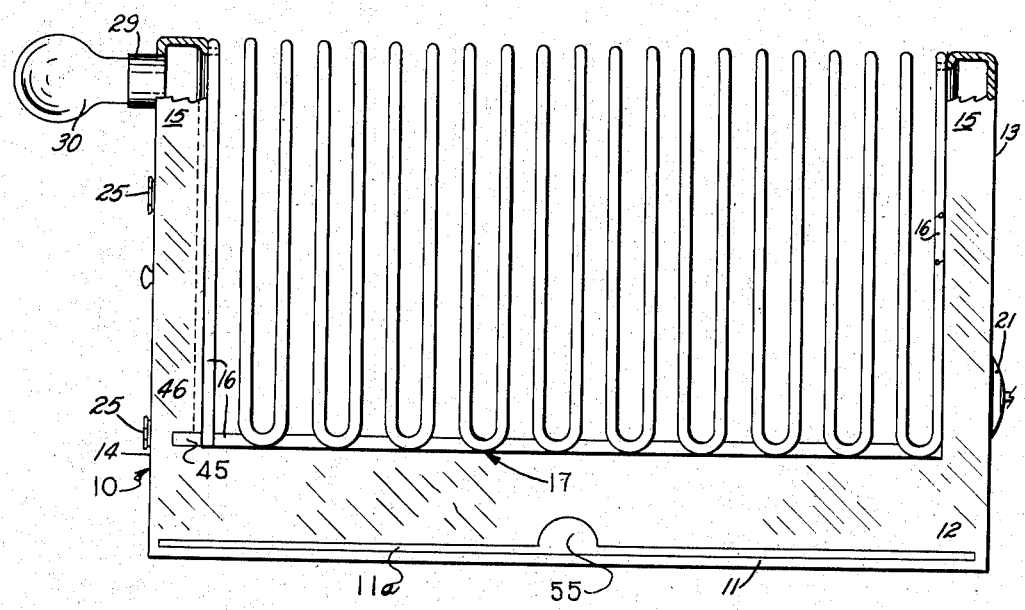
Fig. 3 is an elevation of the rear end of the appliance.

Illustrated in the drawings is a frame having a rectangular lower body portion affording a depository pan 10 sufficiently wide for the electrocuted fly carcasses to be precipitated thereinto and sufficiently high to retain a suitable quantity of the electrocuted fly carcasses and to conceal the same from view. In Figures 6 and 9 this pan 10 is illustrated as an integral body portion of the frame in which case the carcasses are poured out by tilting the frame. This pan 10 may be of a detachable design, or it may have a floor 11 withdrawable in the form of a slide, shown in Figure 5, or in the form of a hinge-biased floor plate, shown in Figure 4, to permit easy cleaning thereof.

The pan 10 further includes side walls 12, which are preferably relatively low and normally perpendicular to the floor 11, and end walls 13 and 14, which project above the horizontal plane of the side walls 12 and illustrated as having correspondingly converging edges rounded at the top of each wall. These end walls 13 and 14 are provided with reinforcing flanges 15 extending toward and in alignment with each other. The inner edges of these flanges 15 and the horizontal edges of the side walls 12 are in the form of complementary recessed marginal portions 16 affording a recessed nesting for the grille hood 17, whereby the outer periphery of the flanges 15 and the hood 17 is secured. The hood 17 is further interlocked to the frame by an anchor 45 positioned at each terminal of the wire hood member, the anchors being inserted into the apertures 46 formed in the transversely disposed portions that recess the marginal portions 16.

The end wall 13 has a round opening 20 provided with a receptacle 21, or other type of electrical connector, preferably positioned above the plane of the top of the girder 22.

The end wall 14 has a quadrilateral opening 23, the height of which, as illustrated, exceeds the maximum width at the bottom thereof as the edges thereof are somewhat pitched inwardly. This opening 23 is preferably provided with some type of closure such as a door 24 carried by the hinges 25 and provided with latching means as indicated at 26. Above the plane of the top of the top girder 27 is another small round opening 28 for receiving the socket 29 which is provided with an indicating light 30.

Extending horizontally between the end walls 13 and 14 is an electrical grid 31 including two superposed girders 22 and 27, two end plates 32 and 33, and two wire or cable conductors 18 and 19.

The girders are of dielectrical material and are spaced apart vertically, the bottom girder 22 being juxtaposed between the side walls 12 so that the top of the girder and the tops of the side walls are preferably in the same horizontal plane whereby said girder 22 affords obstruction to a transverse view, thereby concealing the electrocuted fly carcasses in the pan 10. The bottom girder 22 is preferably wider than the top girder 27. These girders, as illustrated, have complementary spiral and parallel grooves 39 formed in the outer peripheries and are preferably rounded, and have complementary inner faces 42 and 43, which are preferably flat.

The support end plates 32 and 33 are adapted to carry the girders 22 and 27. They are secured to the end faces of the girders by screw means 47 and 48 and subsequently together therewith installed between the end walls 13 and 14. The end plates are secured by screw means 34 and 36 to said end walls. The end plates 32 and 33 could be omitted and the girders 22 and 27 secured directly to the end walls 13 and 14, but it would be less convenient to wind the conductors 18 and 19 onto the girders 22 and 27 after the same shall have been installed. The plate 32 has a circular opening 35 registering with the opening 20 in the end well 13, and the plate 33 has an opening 37 registering with the opening 23 in the end wall 14.

The conductors 18 and 19 have two adjacent ends thereof communicated to the terminals of the connector 49, which is provided with the receptacle plug 21 or a pair of flexible electrical conductors (not shown) provided with a connector on the free ends thereof. These conductors 18 and 19 are subsequently spirally and parallelly wound as spiraled strands onto the girders 22 and 27 in the grooves 39 thereof. The free ends of the conductors 18 and 19 are then secured to the remote end of one girder or to the ends of both girders by terminal screw means 51. These terminals 51 are electrically connected to the indicating light 30, which is preferably a neon light in a resistor circuit and preferably an incandescent bulb in a transformed circuit. These conductors 18 and 19 are spaced apart in the coils or spirals thereof sufficiently to facilitate the contacting of both conductors simultaneously by a fly.

One of the conductors 18 or 19 may be provided with a resistor in series or they may be both electrically communicated to the terminals of the secondary circuit of a step-down transformer. These conductors carry opposed electrical charges of voltage sufficiently high to electrocute flies, but sufficiently low to be safe to humans or animals.

A fly luring element 44 of dielectrical material and preferably of quadrilateral form is insertable through the opening 23 into the space between the girders 22 and 27 and between the lateral strands of the electrocuting conductors 18 and 19 to afford attractive continuous streamlined surfaces. This element 44 is disposed preferably close to the conductors 18 and 19 to afford a promenade for the flies to promote the contacting of the conductors simultaneously and to permit the partially electrocuted flies to be precipitated upon the adjacent conductor strands to defeat revival thereof, and to slide down the inclined conductors, thereby very much prolonging the electrocuting contact.

Figure 12:
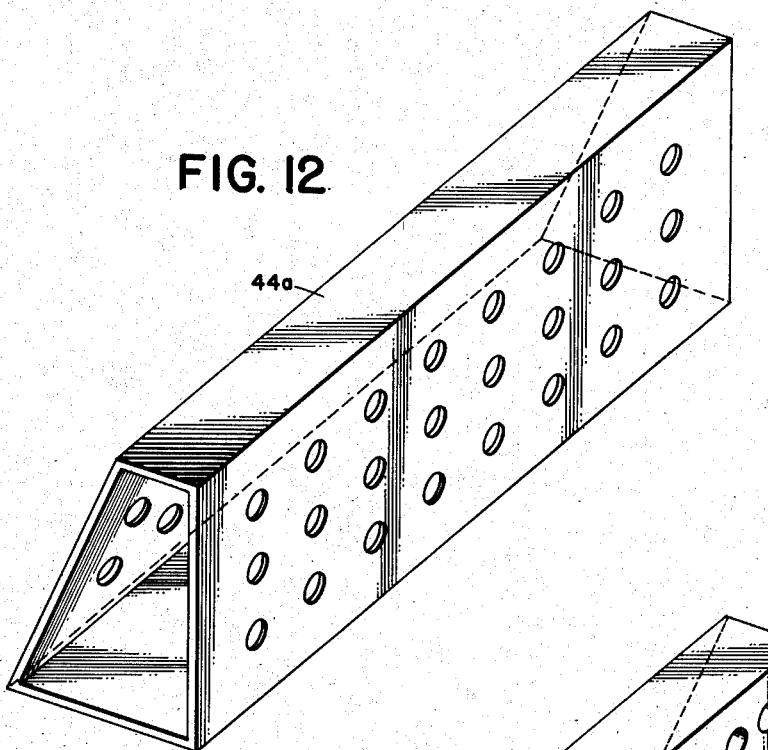
Fig. 12 is a perspective view of a hollow scenting element with foraminous lateral sides and a separate scenting element in the hollow thereof.
Figure 13:
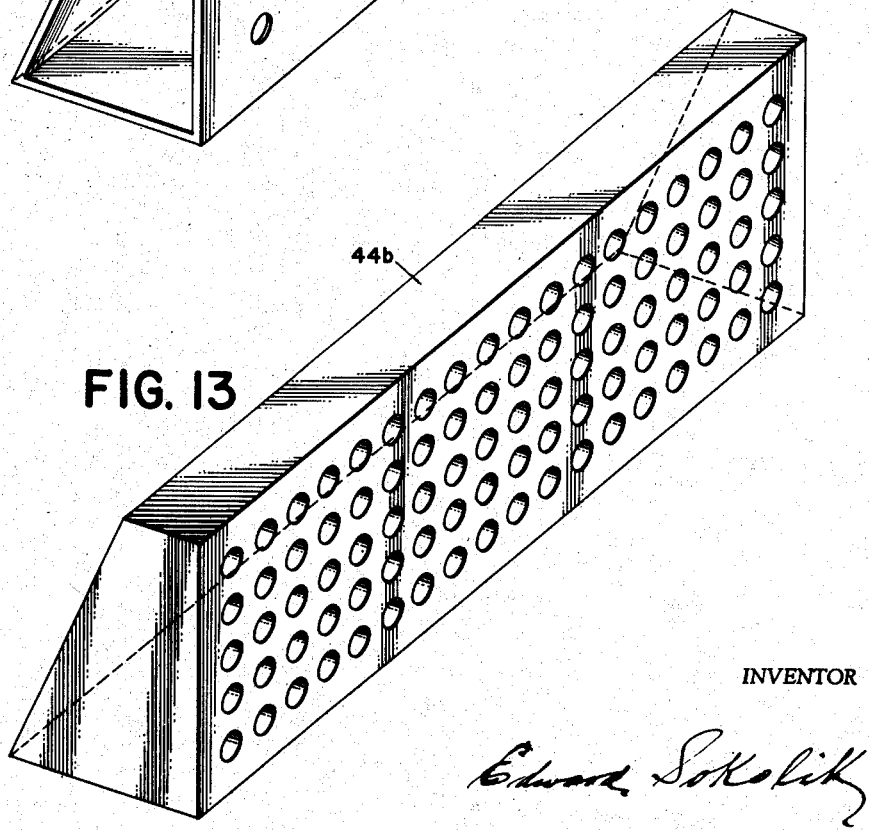
Fig. 13 is a perspective view of a solid scenting element with foraminous lateral sides impregnated with scenting material.

This luring element 44 may be of porous or foraminous dielectric material (Fig. 13) impregnated with scenting material, or it may be hollow and apertured (Fig. 12) and loaded with scenting material in the hollow thereof, the scent effusing through the apertures.

Figure 4:
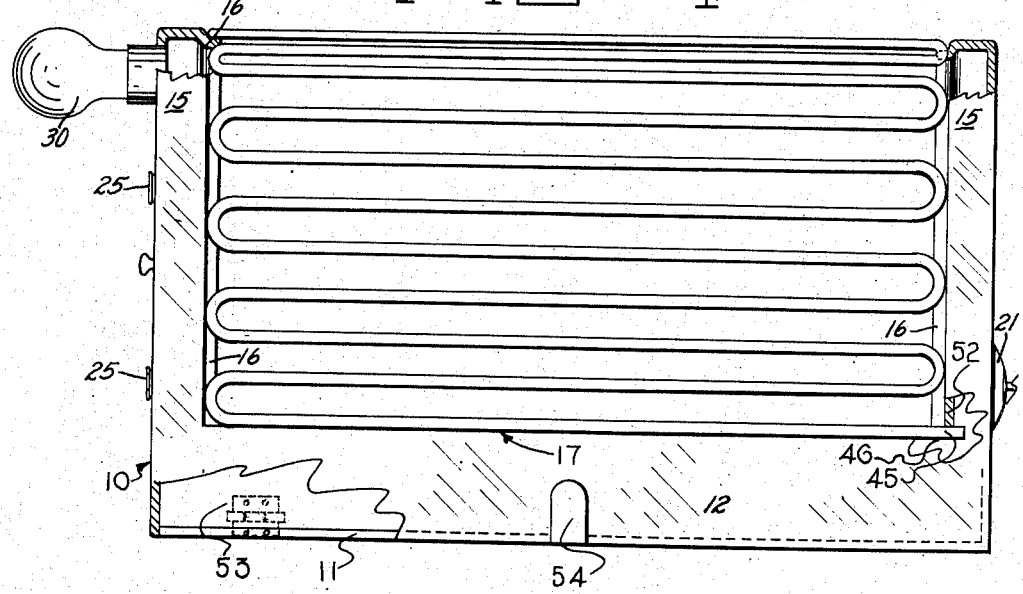
Fig. 4 is a side elevation of the frame with portions broken off and a wire grille hood with horizontal wire members, mounted thereupon.

In the Figure 4 is illustrated a wire grille hood 17 mounted on the frame. The wire members thereof are horizontally disposed. The free ends 45 of the grille wire are extended and interlocked in the apertures 46 of the transversely disposed portions 52 that offset the marginal portions 16. Also illustrated in this figure is a hinge 53 biased floor 11 provided with a latching means 54 cooperating with the side wall 12, which is indented therefor.

In the Figure 5 is illustrated a wire grille hood 17 mounted on the frame. The wire members thereof are uprightly disposed. The free ends 45 of the grille wire are extended and bent horizontally outwardly and interlocked in the apertures 46 of the transversely disposed portions 52 that offset the marginal portions 16. Also illustrated in this figure is a sliding floor 11A provided with a finger-piece 55.

In the Figure 10 is illustrated a schematic diagram of the electrical assembly of the device in which the voltage is limited by a high resistance in series with the spiraled conductors 18 and 19. 56 designates the resistance, 57 is a small neon light to indicate that the circuit is in operation. This light is in electrical communication with the free ends of the spiraled conductors 18 and 19, as indicated at 51 in Fig. 1.

In the Figure 11 is illustrated a schematic diagram of the electrical assembly of the device in which the voltage is limited by a step-down transformer 60. The primary circuit 61 being in communication with the electrical source 62 and the secondary circuit being in communication with the electrical assembly of the device. 63 designates a small incandescent light bulb in communication with the free ends of the conductors 18 and 19 as indicated at 51 in Fig. 1.

I have described and illustrated one form of the device, which is susceptible to various other forms of arrangement such as horizontal or vertical prisms, or cones, or frustrums in which the electrocuting grid would be vertically disposed. The grille hood could be formed of parallel metal strip members connected at the ends thereof to marginal edge strip members.

The two systems of electrical hook-up may also be variously arranged such as by installing a bulb socket within the frame—in the rear end wall of the form of frame illustrated—into which a light bulb, after the element 44 shall have been removed, may be inserted, or the light bulb lure, preferably provided with a switch, and a portion of the scenting lure may each simultaneously occupy a portion of the confines of the device providing a combined scent and light lure.

In view of the analogous uses, the numerous arrangements as to design of the device and the electrical hook-up, I desire to be bound by the appended claims and not by the partial disclosure.

What I claim is:

1. An insect electrocuting appliance comprising a frame of sheet material; an electrocuting grid disposed in the frame; insect luring means disposed within the grid; and a grille hood disposed over the grid; said frame including a base affording a depository pan disposed beneath the grid to intercept the electrocuted carcasses as the same are precipitated from said grid and to conceal the carcasses therein, said pan embodying a floor and a surrounding wall, said surrounding wall having a horizontal inwardly recessed marginal portion along the edge at the top thereof, provided with means for anchoring the grille hood, said electrocuting grid including spaced apart girders of dielectrical material, in superposed relation and within the frame and having means for spacing the conductors of said grid, a pair of flexible conductors parallelly and spirally wound around the girders in spacing means; and indicating light means and voltage limiting means in communication with the conductors, said insect luring means being displaceable and disposed between the girders substantially filling the confines within the grid, thereby affording a streamlined promenade surface for the insects immediately subjacent the conductor strands, said displaceable grille hood including integrally united parallel members interlocked upon the inwardly recessed marginal portion of the wall, thereby effecting a streamlined surface of the hood and the frame.

2. An insect electrocuting appliance including in combination: a frame made of suitable sheet material and having a base in the form of a pan affording a receptacle for the electrocuted insects, which are precipitated thereinto, said receptacle having a floor and side and end walls extending uprightly from the floor, each end wall extending higher than the side walls and having a reenforcing flange extending in alignment with and toward each other, said reenforcing flanges and the side walls having complementary inwardly recessed marginal portions affording a nesting adapted to accommodate the perimetric edges of a hood, one end wall having an opening provided with a closure means; an electrocuting grid extending from end wall to end wall and including a pair of superposed girders of dielectrical material, extending from end wall to end wall, a pair of flexible electrical conductors carrying opposed electrical currents, wound as spiraled strands, around the two girders, said grid being provided with means for connecting the electrical conductors to an electrical source, said means including an indicating light, means for limiting the voltage, and circuit connections for said light and means for limiting the voltage; scent effusing means for luring the insects onto the electrical grid, and adapted to be inserted through the opening in the end wall into the confines of said electrocuting grid, said scent effusing means having foraminous lateral sides extending beneath the strands of the electrical conductors from end wall to end wall, said sides permitting scent to be effused and affording surfaces adapted for the insects to promenade thereupon, and to simultaneously contact two adjacent strands of the conductors to be electrocuted thereby, and a grille hood displaceably nested upon the inwardly recessed marginal portions of the flanges of the end walls, and of the side walls to provide a streamlined periphery with the frame, said hood consisting of a plurality of parallelly spaced apart alternately opposed wire U-loop members extending one-way and connected to one another, each outer U-loop member having the free end thereof yieldably interlocked in an aperture formed in the frame.

3. Claim 2 as defined in which the means for limiting the voltage, is a step-down transformer.

4. Claim 2 as defined in which the means for limiting the voltage, is a resistor connected in series with the conductors.

5. Claim 2 as defined in which the scent effusing means is a hollow element having foraminous lateral sides, said hollow element being provided with scent effusing material in the hollow thereof, the scent effusing through said foraminous sides.

6. An insect electrocuting appliance including in combination: a frame made of sheet material and having a base in the form of a receptacle for receiving the electrocuted insects and recessed marginal portions for receiving a hood; an electrocuting grid provided with means for connecting the grid to an electrical source, said grid including superposed girders of dielectrical material disposed in and carried by the frame, a pair of flexible conductors carrying opposed electrical currents are parallelly and spirally wound around the girders, and said connecting means including an indicating light means, means for limiting voltage, and circuit connections for said light means and means for limiting voltage; scent effusing means disposed within the confines of the electrocuting grid, said scent effusing means having foraminous lateral sides extending beneath the conductors, said sides permitting scent to be effused and affording a surface for the insects to promenade thereupon to promote simultaneous contact with the conductors and be electrocuted thereby, and a grille hood interlockably nested in the recessed marginal portions of the frame over the electrocuting grid, said hood consisting of parallelly spaced apart alternately opposed wire U-loop members extending one-way and connected to one another.

7. Claim 6 as defined in which the voltage limiting means is a step-down transformer.

8. Claim 6 as defined in which the voltage limiting means is a resistor connected in series with the conductors.

9. Claim 6 as defined in which the scent effusing means is a hollow element having foraminous lateral sides, said hollow element being provided with scent effusing material in the hollow thereof, the scent effusing through said foraminous sides.

10. An insect electrocuting appliance including in combination: a frame made of suitable sheet material and having a base in the form of a pan affording a receptacle for the electrocuted insects, which are precipitated thereinto, said receptacle having a floor hinged to the frame, and side and end walls extending up perpendicular to the floor, each end wall extending higher than the side walls and converging toward, and rounded at the top thereof, the portions of the end walls that extend higher than the side walls having reenforcing flanges extending toward each other, said flanges and the side walls having complementary inwardly recessed marginal portions affording a nesting adapted to accommodate the perimetric edges of a hood, one end wall having an opening provided with a hinge biased door; an electrocuting grid extending from end wall to end wall and including a pair of superposed girders of dielectrical material, and provided at each pair of ends thereof with a plate support secured to the ends of the girders and to the end walls, the top girder having a rounded top periphery provided with parallelly spaced apart spiraled grooves and a horizontally flat underside, and the bottom girder being stouter, at least laterally, and having a rounded bottom periphery provided with parallelly spaced apart spiraled grooves and a horizontally flat upperside, said bottom girder being juxtaposed between the side walls to provide an obstruction, whereby to conceal the electrocuted insects in the pan; a pair of flexible electrical conductors carrying opposed electrical currents, wound, as spiraled strands, around the two girders in the spacing grooves thereof, said grid being provided with means for connecting the electrical conductors to an electrical source, said means including an indicating light, a voltage resistor connected in series with the conductors, and connections for said light and voltage resistor; a scent effusing means for luring the insects onto the electrical grid, adapted to be inserted through the opening in the end wall into the confines of said electrocuting grid, said means consisting of a dielectrical material and having foraminous lateral sides impregnated with scenting material and extending beneath the strands of the conductors, said sides effusing scent and affording inclined surfaces adapted for the insects to promenade thereupon and to simultaneously contact two adjacent strands of the conductors to be electrocuted thereby and precipitated down the inclined surfaces, thereby prolonging the electrocuting contact, and a grille hood displaceably nested upon the inwardly recessed marginal portions of the flanges of the end walls and of the side walls to provide a streamlined periphery with the frame, said hood consisting of a plurality of parallelly spaced apart alternately opposed wire U-loop members extending uprightly and connected to one another, each outer U-loop member having the free end thereof yieldably interlocked in an aperture formed in the frame.

11. In an insect electrocuting appliance, a frame, an electrocuting grid provided with means for connecting said grid to an electrical source, disposed in and carried by said frame, said grid including a pair of superposed girders of dielectrical material, a pair of flexible electrical conductors carrying opposed electrical currents, wound as spiraled strands around the girders and said means for connecting the grid to an electrical source including indicating light means, means for limiting the voltage, and circuit connections for said light means and means for limiting the voltage.

12. Claim 11 as defined and a wire grille hood disposed over the grid in the frame, said grille hood being displaceably interlocked and streamlined with the periphery of the frame.

EDWARD SOKOLIK.

References Cited in the file of this patent
UNITED STATES PATENTS

| Number | Name | Date |
|---|---|---|
| 1,200,993 | Seasholtz | Oct. 10, 1916 |